(12) United States Patent
Wang et al.

(10) Patent No.: US 7,555,411 B2
(45) Date of Patent: Jun. 30, 2009

(54) METHOD AND APPARATUS TO MONITOR A TEMPERATURE SENSING DEVICE

(75) Inventors: Wei D. Wang, Troy, MI (US); Peter E. Wu, Brighton, MI (US); Slobodan Gataric, Indianapolis, IN (US); Stephen T. West, New Palestine, IN (US); Harry J. Bauer, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/669,439

(22) Filed: Jan. 31, 2007

(65) Prior Publication Data

US 2008/0181280 A1    Jul. 31, 2008

(51) Int. Cl.
G06F 11/00 (2006.01)
(52) U.S. Cl. ...................................................... 702/188
(58) Field of Classification Search .................... 702/57, 702/58, 59, 65, 90, 93, 99, 104, 116, 130, 702/131, 146, 182; 374/56, 100, 102, 152
See application file for complete search history.

(56) References Cited

U.S. PATENT DOCUMENTS

| | | | |
|---|---|---|---|
| 5,715,178 A * | 2/1998 | Scarola et al. | ............... 702/116 |
| 5,995,887 A | 11/1999 | Hathaway | |
| 6,463,892 B1 | 10/2002 | Russell | |
| 6,598,195 B1 | 7/2003 | Adibhatla | |
| 6,701,282 B2 | 3/2004 | Ting | |
| 6,724,313 B2 | 4/2004 | Sato | |
| 6,759,964 B2 | 7/2004 | Sato | |
| 6,786,639 B2 | 9/2004 | Covi | |
| 6,899,080 B2 * | 5/2005 | Pursifull et al. | .............. 123/399 |
| 7,130,772 B2 * | 10/2006 | Burnet et al. | ................ 702/189 |
| 7,200,469 B2 * | 4/2007 | Katrak et al. | ................... 701/1 |
| 2002/0193921 A1 | 12/2002 | Reese, II | |
| 2003/0076233 A1 | 4/2003 | Sato | |
| 2004/0056765 A1 * | 3/2004 | Anderson et al. | ........... 340/522 |
| 2005/0178130 A1 | 8/2005 | Van Gilder | |
| 2006/0137436 A1 * | 6/2006 | Buck et al. | ..................... 73/116 |

FOREIGN PATENT DOCUMENTS

| | | |
|---|---|---|
| DE | 3145333 C2 | 5/1983 |
| EP | 1607727 A1 | 12/2005 |

OTHER PUBLICATIONS

Dictionay.com, Definition of a subset, pp. 1-3.*
Loughry et al., Efficiently enumerating the subsets of a set, Dec. 12, 2000, Department of Mathematics and Computer science University of Antwerp RUCA, pp. 1-10.*

* cited by examiner

*Primary Examiner*—Edward Raymond
*Assistant Examiner*—Mohamed Charioui

(57) ABSTRACT

A method and an article of manufacture are provided to monitor a temperature sensing circuit and detect a fault therein. The method comprises monitoring sensor readings output from a plurality of temperature sensing circuits. An average sensor reading is determined, calculated from the sensor readings output from a subset of the temperature sensing circuits. Each of the sensor readings is compared to the average sensor reading. A fault is identified when one of the sensor readings deviates from the average sensor reading by an amount greater than a threshold, more particularly when one of the sensor readings deviates from the average sensor reading by an amount greater than the threshold at least a quantity of X times out of Y sensor readings.

9 Claims, 3 Drawing Sheets

METHOD AND APPARATUS TO MONITOR A TEMPERATURE SENSING DEVICE

TECHNICAL FIELD

This invention pertains generally to powertrain control systems and systems for detection of faults therein.

BACKGROUND OF THE INVENTION

Powertrain control architectures include systems for monitoring operation of various components and subsystems to ensure proper control and operation, and to identify component and system faults. This includes devices and control algorithms operative to monitor temperatures of some of the components and subsystems. Temperature monitoring can be accomplished using systems having temperature sensing devices, including circuits which utilize thermo-resistive devices, e.g., thermistors and other sensors. These systems and devices for monitoring temperature may have faults which lead to incorrect readings of temperature, and are often required to be monitored.

Monitoring of temperature sensing systems includes systems operative to detect electrical shorts and open circuits. Monitoring can include rationality monitors, wherein a temperature sensor signal is monitored for signal bias or unexpected variations.

One form of rationality monitoring is an algorithm executed in a control module comprising a mathematical model which predicts a temperature based upon operating conditions, and compares the predicted temperature to a temperature measured by the sensing system to determine whether the sensing system is operating properly. This approach requires engineering effort to develop and calibrate the predictive model, and consumes operating space, memory and execution time in the control module.

A risk of executing a temperature rationality monitor includes occurrence of a falsely indicated fault, wherein a system inaccurately identifies presence of a fault, and can be caused by executing the temperature rationality monitor during extreme environmental conditions, or electrical circuit noise, or errors in digital signal processing. One method to address such concerns includes limiting operating conditions as which rationality tests can be conducted, which results in reduced signal resolution, or reduced temperature sensing range.

There is a need for a temperature monitoring scheme which addresses the issues described. Such a system is described hereinafter.

SUMMARY OF THE INVENTION

In accordance with an embodiment of the invention, a method and an article of manufacture are provided to monitor a temperature sensing circuit and detect a fault therein. The method comprises monitoring sensor readings output from a plurality of temperature sensing circuits. An average sensor reading is determined, calculated from the sensor readings output from a subset of the temperature sensing circuits. Each of the sensor readings is compared to the average sensor reading. A fault is identified when one of the sensor readings deviates from the average sensor reading by an amount greater than a threshold, more particularly when one of the sensor readings deviates from the average sensor reading by an amount greater than the threshold at least a quantity of X times out of Y sensor readings.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
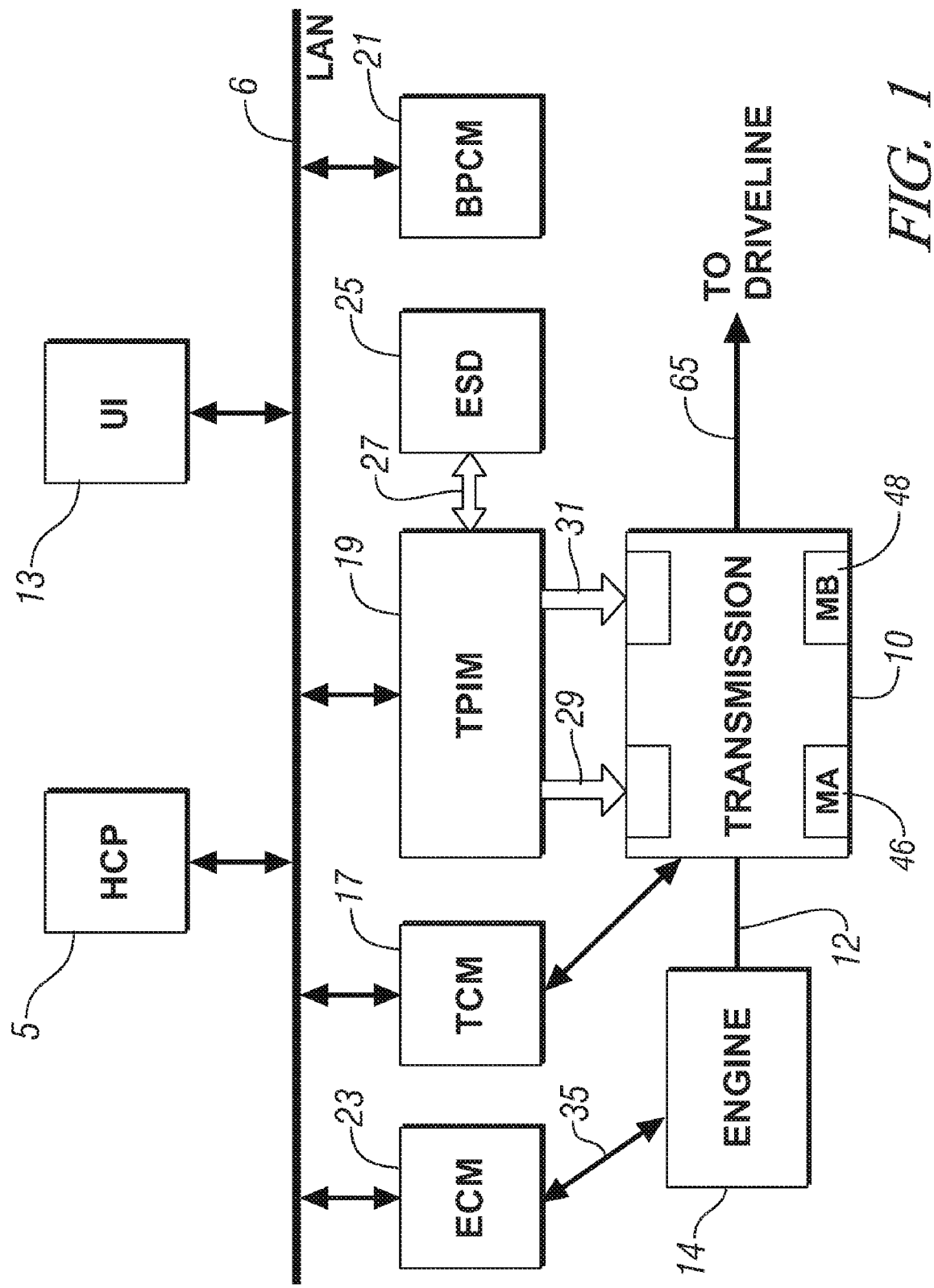
FIG. 1 is a schematic diagram of an exemplary architecture for a control system and powertrain, in accordance with the present invention.
Figure 2:
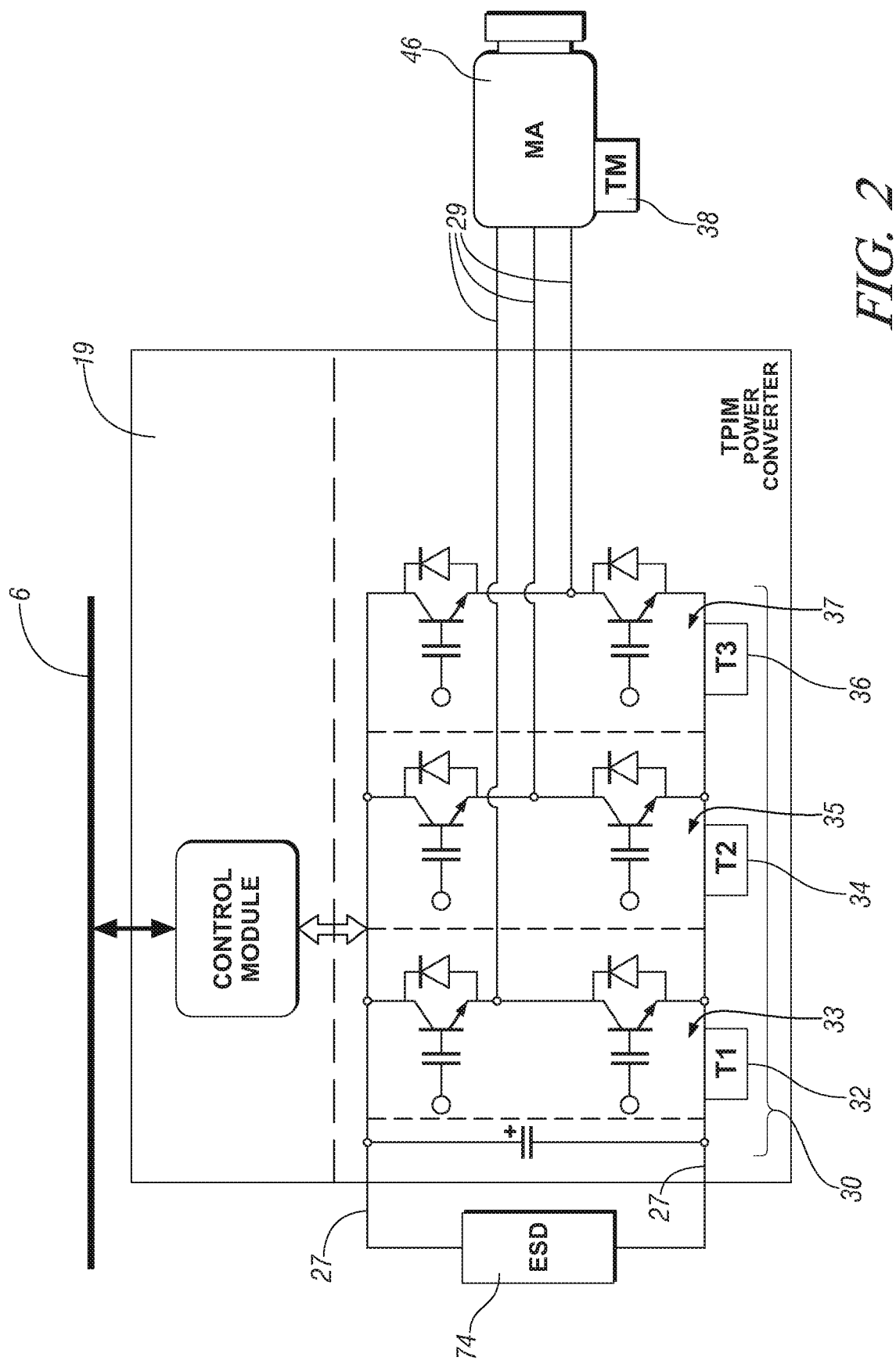
FIG. 2 is a schematic diagram, in accordance with the present invention.

Referring now to the drawings, wherein the showings are for the purpose of illustrating the invention only and not for the purpose of limiting the same, FIGS. 1 and 2 depict schematic diagrams of a powertrain control system which has been constructed in accordance with an embodiment of the invention. The elements described hereinafter are operable to provide coordinated control of the powertrain system described herein. The powertrain comprises an internal combustion engine 14 and an electro-mechanical transmission 10 operative to provide a torque output to a driveline via an output shaft 65. The electromechanical transmission 10 includes a pair of electrical machines MA, MB 46, 48. The engine, transmission, and electrical machines are operative to transmit torque therebetween according predetermined control schemes and parameters not discussed in detail herein.

In the embodiment depicted, the transmission 10 receives input torque from the torque-generative devices, including the engine 14 and the electrical machines MA 46 and MB 48 as a result of energy conversion from fuel or electrical potential stored in an electrical energy storage device (ESD) 25. The electrical machines MA and MB each comprise a three-phase AC electrical machine having a rotor rotatable within a stator. The rotor transmits motive torque. The electrical machines operate as torque generating devices and as electrical energy generating devices. The ESD 25 typically comprises one or more batteries. Other electrical energy and electrochemical energy storage devices that have the ability to store electric power and dispense electric power may be used in place of the batteries without altering the concepts of the present invention. The ESD 25 is preferably sized based upon factors including regenerative requirements, application issues related to typical road grade and temperature, and propulsion requirements such as emissions, power assist and electric range. The ESD 25 is high voltage DC-coupled to a transmission power inverter module (TPIM) 19 via DC transfer conductors 27. The TPIM 19 is an element of the control system. The TPIM 19 transmits electrical energy to and from MA 46 by transfer conductors 29, and the TPIM 19 similarly transmits electrical energy to and from MB 48 by transfer conductors 31. Electrical current is transmitted to and from the ESD 25 in accordance with whether the ESD 25 is being charged or discharged. TPIM 19 includes the pair of power inverters and respective motor control modules configured to receive motor control commands and control inverter states therefrom for providing motor drive or regeneration functionality. Each of the power inverters comprises a plurality of insulated gate bipolar transistors (IGBT) which comprise switches that convert DC power from the energy storage device 20 to AC power for powering one of the electrical machines MA, MB, by switching at high frequencies. There is typically one IGBT for each phase of the three-phase electric machine.

The control system synthesizes pertinent information and inputs, and executes algorithms to control various actuators to achieve control targets, including such parameters as fuel economy, emissions, performance, driveability, and protection of hardware, including batteries of ESD 25 and MA and MB 46, 48. The exemplary embodiment, there is a distributed control module architecture including an engine control module ('ECM') 23, a transmission control module ('TCM') 17, battery pack control module ('BPCM') 21, and the TPIM 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21, based upon various input signals from the UI 13 and the powertrain, including the battery pack. The ECM 23 is operably connected to the engine 14, and functions to acquire data from a variety of sensors and control a variety of actuators, respectively, of the engine 14 over a plurality of discrete lines collectively shown as aggregate line 35. The TCM 17 is operably connected to the transmission 10 and functions to acquire data from a variety of sensors and provide command signals to the transmission, including monitoring inputs from pressure switches and selectively actuating pressure control solenoids and shift solenoids to actuate various clutches to achieve various transmission operating modes. The BPCM 21 is signally connected one or more sensors operable to monitor electrical current or voltage parameters of the ESD 25 to provide information about the state of the batteries to the HCP 5. Such information includes battery state-of-charge ('SOC'), battery voltage and available battery power.

Each of the aforementioned control modules preferably comprises a general-purpose digital computer generally including a microprocessor or central processing unit, storage mediums comprising read only memory (ROM), random access memory (RAM), electrically programmable read only memory (EPROM), high speed clock, analog to digital (A/D) and digital to analog conversion (D/A) circuitry, and input/output circuitry and devices (I/O) and appropriate signal conditioning and buffer circuitry. Each control module has a set of control algorithms, comprising machine-executable code and calibrations resident in the ROM and executable to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

Referring now to FIG. 2, more details of the exemplary system are depicted, comprising hardware for controlling one of the electrical machines. The system comprises the high-voltage electrical power source ESD 25, a portion of the TPIM 19 including the control module, and electrical machine MA 46, which are interconnected via electrical conductor cables. The TPIM includes a pair of power converter control circuits, or inverters, which comprise known complementary three-phase power electronics devices. One of the inverter circuits (shown as 30) comprises a plurality of contiguous electrical circuits 33, 35, 37, having power IGBT transistor devices arranged in series, each which is controlled by the control module to transmit electrical energy between the ESD 25 and the electrical machine 46. The inverter circuit 30 converts DC electrical power output from the ESD 25 to AC power for driving the electrical machine 46 and converts AC electrical power generated by the electrical motor to DC electrical power for charging the ESD 25. The ESD 25 is high-voltage coupled to each of control circuits 33, 35, 37 via DC transfer conductors 27.

A temperature sensing network comprises a plurality of temperature sensors and electrical circuits operative to monitor temperatures of contiguously located devices, e.g., the control circuit 30 and electrical machine 46. Each circuit 33, 35, 37 includes a temperature sensing circuit comprising a corresponding temperature sensing device 32, 34, 36 and an electrical signal processing circuit consisting of resistive devices, electrical cable, electrical connectors, and other elements effective to process and communicate an electrical signal from one of the temperature sensing devices to the control module (not shown). The temperature sensing devices T1 32, T2 34, T3 36 each preferably comprise a thermo-resistive device which generates an electrical signal correlatable to a temperature measured at the respective circuit. Thus, device T1 generates a temperature signal $T_{INV1}$, device T2 generates a temperature signal $T_{INV2}$, and device T3 generates a temperature signal $T_{INV3}$. A temperature sensing device TM 38, preferably also comprising a thermo-resistive device, is operative to generate an electrical signal correlatable to a temperature measured in the electrical machine, $T_M$. The thermo-resistive device can comprise a known thermistor device, with the electrical signal processing circuit including one or more resistive devices sized and calibrated appropriately to monitor temperature over the range of operating temperatures for the monitored electrical machine 46 and the control circuit 30.

Figure 3:
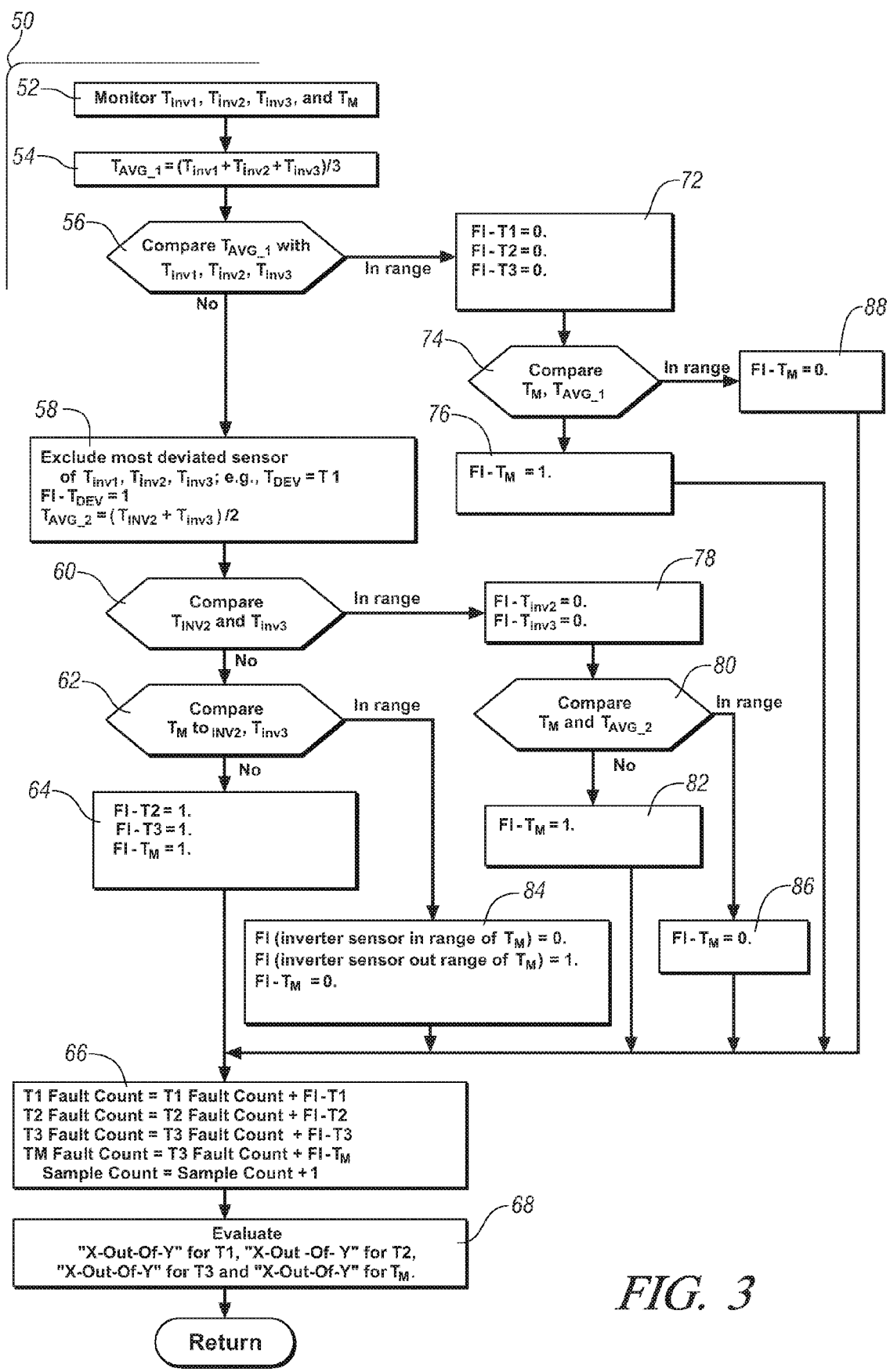
FIG. 3 is a logic flowchart, in accordance with the present invention.

Referring now to FIG. 3, a method 50 for monitoring outputs from the temperature sensing network to detect a fault therein is described, in accordance with an embodiment of the invention. The method comprises, overall, monitoring sensor readings output from a plurality of temperature sensing circuits. An average sensor reading is calculated from the sensor readings output from a subset of the temperature sensing circuits, and each of the sensor readings is compared to the average sensor reading. When one of the sensor readings deviates from the average sensor reading by an amount greater than a threshold, actions are taken. The method is preferably executed as one or more algorithms in the control system during one of the predetermined loop cycles. The method 50 comprises monitoring outputs of the sensor circuits for sensors T1, T2, T3, and TM to obtain temperature sensor readings of $T_{INV1}$, $T_{INV2}$, $T_{INV3}$, and $T_M$ from the respective sensor circuit (Step 52). A first average temperature, $T_{AVG\_1}$, is determined based upon $T_{INV1}$, $T_{INV2}$, $T_{INV3}$ (Step 54), and then compared to each of the readings $T_{INV1}$, $T_{INV2}$, $T_{INV3}$ (Step 56).

When one or more of $T_{INV1}$, $T_{INV2}$, $T_{INV3}$ fall outside of a predetermined range a fault increment (FI) for the sensor which most greatly deviates from the first average temperature, $T_{AVG\_1}$ is set equal to one ("1"). By way of example, the most greatly deviating reading is identified as $T_{INV1}$ in this flowchart. A second average temperature, $T_{AVG\_2}$ is determined based upon the readings from the remaining two sensors, $T_{INV2}$, $T_{INV3}$ (Step 58) and compare thereto (Step 60). When readings from the remaining two sensors, $T_{INV2}$, $T_{INV3}$ differ by a predetermined value and are outside of a range, $T_{INV2}$ and $T_{INV3}$ are each compared to $T_M$ (Step 62). When the comparisons of $T_{INV2}$ and $T_{INV3}$ to $T_M$ are both outside of a predetermined range, a fault increment (FI) for each of the sensors T2, T3, TM are set equal to one ("1") (Step 64). When the comparisons of one of $T_{INV2}$ and $T_{INV3}$ to $T_M$ is outside of a predetermined range, a fault increment for the out-of-range sensor, i.e., either T2 or T3 is set equal to one ("1") (Step 84).

When readings from the remaining two sensors, $T_{INV2}$, $T_{INV3}$ are within range of each other (Step 60), fault increments for both sensors are set equal to zero ("0"), i.e., FI-T2=0, FI-T3=0 (Step 78). The reading for $T_M$ is compared to the second average temperature, $T_{AVG\_2}$ (Step 80), and when within a predetermined range, a fault increment for sensor $T_M$ (FI-TM) is set equal to zero ("0") (Step 86). When the reading for $T_M$ is outside the predetermined range, the fault increment for sensor $T_M$ (FI-TM) is set equal to one ("1") (Step 82).

When the first average temperature, $T_{AVG\_1}$, is compared to each of the readings $T_{INV1}$, $T_{INV2}$, $T_{INV3}$ (Step 56), and none of $T_{INV1}$, $T_{INV2}$, $T_{INV3}$ fall outside of the predetermined range the fault increments (FI) for sensors T1, T2, T3 are set equal to zero ("0") (Step 72). The first average temperature, $T_{AVG\_1}$, is compared to $T_M$ (Step 74), and when $T_M$ is within range, the fault increment (FI) for sensor TM is set equal to zero (Step 88). When $T_M$ is out-of-range, the fault increment (FI) for sensor TM is set equal to one (Step 76).

When fault increments (FI) for sensors T1, T2, T3, and TM have been set, either to "1" or "0", fault counts for each sensor are incremented by the corresponding fault increment, and a sample counter is incremented (Step 66). The fault counts are evaluated (Step 68) using an "X out of Y" analysis, wherein "X" represents the fault count for each sensor and "Y" represents a total number of samples. Thus each fault count is evaluated to determine whether the quantity of faults occurring exceed a threshold quantity of faults for the number of samples.

It is preferable to execute the control scheme described herein after a cold start event, wherein the temperatures have equilibrated among the various circuits and devices, thus facilitating a common baseline temperature for all the devices monitored. It is preferable to monitor temperatures, within a range of temperatures that is predetermined based upon output of the thermistors or other temperature sensors used, in order to permit effective measurement of temperatures in view of the signal range and capabilities of the sensor and the resolution of A/D converter of the control module.

It is understood that modifications in the hardware are allowable within the scope of the invention. The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for monitoring temperatures of an electrical machine and a machine control circuit, comprising:

monitoring sensor readings output from a plurality of temperature sensors operative to monitor the electrical machine and the machine control circuit;

determining an average sensor reading calculated from the sensor readings output from a subset consisting of less than all of the temperature sensors;

identifying a fault in one of the temperature sensors when the corresponding sensor reading deviates from the average sensor reading by an amount greater than a threshold.

2. The method of claim 1, wherein identifying a fault in one of the temperature sensors further comprises:

regularly monitoring the sensor readings output from the temperature sensors;

setting a fault increment when the sensor reading corresponding to the one of the temperature sensors deviates from the average sensor reading by an amount greater than the threshold; and, identifying a fault in the one of the temperature sensors when there are at least a quantity of X fault increments out of Y sensor readings corresponding to the one of the temperature sensors.

3. The method of claim 1, wherein determining the average sensor reading calculated from the sensor readings output from the subset of the temperature sensors comprises calculating an average sensor reading from the sensor readings output from the temperature sensors operative to monitor the machine control circuit.

4. The method of claim 1, further comprising determining one of the temperature sensors is functioning acceptably when the corresponding sensor reading is within range of the average sensor reading.

5. The method of claim 1, further comprising regularly monitoring the sensor readings after a cold start event.

6. Method to detect a fault in a temperature sensing circuit, comprising:

monitoring sensor readings output from a first set of temperature sensing circuits operative to monitor an electrical machine and a second set of temperature sensing circuits operative to monitor machine control circuits;

calculating an average sensor reading from the sensor readings output from a subset consisting of only temperature sensing circuits from the second set that are determined to have sensor reading outputs within a first predetermined range to the average sensor reading; and designating as faulty those temperature sensing circuits from the first and second sets that are determined to have sensor reading outputs out of a second predetermined range to the average sensor reading.

7. Method to detect faults in a plurality of contiguous temperature sensing circuits including mutually exclusive first and second sets of temperature sensors, comprising:

determining an average temperature reading of a subset of the first set of temperature sensors wherein the subset consists of only ones of the first set of temperature sensors that are determined to be within a first predetermined range to the readings of the other temperature sensors of the subset;

designating as faulty those sensors from the first set of sensors that are determined to be out of a second predetermined range to the readings of the other temperature sensors of the subset; and designating as faulty sensors from the second set of sensors that are determined to be out of range relative to the sensors of the subset.

8. Method to detect faults in a plurality of contiguous temperature sensing circuits including mutually exclusive first and second sets of temperature sensing circuits, comprising:

monitoring sensor readings output from the plurality of contiguous temperature sensing circuits, calculating an average sensor reading from the sensor readings output from a subset of the first set of temperature sensing circuits, wherein the subset consists of only sensor readings from ones of the first set of temperature sensing circuits that are determined to be within a first predetermined range relative to sensor readings from temperature sensing circuits of the subset;

comparing the sensor readings output from the second set of temperature sensing circuits to the average sensor reading from the sensor readings output from the subset of the first set of temperature sensing circuits; and determining if the sensor readings output from the second set of temperature sensing circuits are within a second predetermined range relative to average sensor readings from the sensor readings output from the subset of the first set of temperature sensing circuits.

9. Method to detect faults in a plurality of contiguous temperature sensors including mutually exclusive first and second sets of temperature sensors, comprising:

determining an average temperature of a subset of the first set of sensors, wherein said subset of sensors includes only sensors from the first set of sensors that are in a predetermined range of the average temperature;

designating as faulty those sensors from the first set of sensors not included in the subset of the first set of sensors; and designating as faulty sensors from the second set of sensors not in the predetermined range of the average temperature.

* * * * *